(12) United States Patent
Ito et al.

(10) Patent No.: US 12,601,907 B2
(45) Date of Patent: Apr. 14, 2026

(54) REFLECTOR SCANNER

(71) Applicant: YITOA MICRO TECHNOLOGY CORPORATION, Kofu (JP)

(72) Inventors: Saburo Ito, Minami-Alps (JP); Yukio Nakazawa, Kofu (JP)

(73) Assignee: YITOA MICRO TECHNOLOGY CORPORATION, Kofu (JP)

( * ) Notice: Subject to any disclaimer, the term of this patent is extended or adjusted under 35 U.S.C. 154(b) by 308 days.

(21) Appl. No.: 18/682,056

(22) PCT Filed: Oct. 8, 2021

(86) PCT No.: PCT/JP2021/037356
§ 371 (c)(1),
(2) Date: Feb. 7, 2024

(87) PCT Pub. No.: WO2023/058226
PCT Pub. Date: Apr. 13, 2023

(65) Prior Publication Data
US 2024/0353675 A1      Oct. 24, 2024

(51) Int. Cl.
*G02B 26/10* (2006.01)
*G02B 7/182* (2021.01)
*H02K 33/18* (2006.01)
(52) U.S. Cl.
CPC ......... *G02B 26/105* (2013.01); *G02B 7/1821* (2013.01); *H02K 33/18* (2013.01)
(58) Field of Classification Search
CPC .. G02B 26/085; G02B 26/105; G02B 7/1821; H02K 33/18
See application file for complete search history.

(56) References Cited

U.S. PATENT DOCUMENTS

| | | | | |
|---|---|---|---|---|
| 2004/0105139 A1* | 6/2004 | Hirose | ................. | G02B 26/085 |
| | | | | 359/199.3 |
| 2005/0024750 A1 | 2/2005 | Kato | | |
| 2020/0033453 A1* | 1/2020 | Kuroki | ................. | G02B 26/10 |

FOREIGN PATENT DOCUMENTS

| | | | |
|---|---|---|---|
| JP | 2004-110005 A | 4/2004 |
| JP | 2004-354283 A | 12/2004 |

(Continued)

OTHER PUBLICATIONS

International Search Report (with translation) and Written Opinion received in corresponding International Application No. PCT/JP2021/037356, mailed Nov. 22, 2021, in 9 pages.

(Continued)

*Primary Examiner* — Alexander P Gross
(74) *Attorney, Agent, or Firm* — Procopio, Cory, Hargreaves & Savitch, LLP

(57) ABSTRACT

The present invention provides a reflector scanner including a frame, a mirror portion connected to inside of the frame via a first elastic member stretching along a second axis, a first and a second drive portions. The frame includes a frame-shaped portion and a set of bridge portions and is held turnably about a first axis. The first drive portion includes: first paired magnets disposed to be opposed to one another such that the first paired magnets interpose the frame on the first axis; a first coil wired in a first annular portion formed by one bridge portion and a portion of the frame-shaped portion at one side of the first paired magnets with respect to the one bridge portion, the one bridge portion being closer to one magnet of the first paired magnets than the mirror portion; and a second coil wired in a second annular portion formed by the other bridge portion and a portion of the frame-shaped portion at the other side of the first paired magnets with respect to the other bridge portion, the other bridge portion being closer to the other magnet of the first (Continued)

paired magnets than the mirror portion. The second drive portion includes: second paired magnets disposed to be opposed to one another such that the second paired magnets interpose a region between the set of bridge portions of the frame on the second axis; and a third coil wired at least in the region between the set of bridge portions of the frame-shaped portion.

8 Claims, 8 Drawing Sheets

(56)                    References Cited

FOREIGN PATENT DOCUMENTS

| | | | |
|---|---|---|---|
| JP | 2008-122955 | A | 5/2008 |
| JP | 2010-107666 | A | 5/2010 |
| JP | 2018-081155 | A | 5/2018 |
| JP | 6726356 | B2 | 7/2020 |
| WO | 2013/168273 | A1 | 11/2013 |
| WO | 2023/058226 | A1 | 4/2023 |

OTHER PUBLICATIONS

Japanese Patent Office, Office Action, Application No. 2025-020657, mailed Oct. 14, 2025, in 7 pages.
Office Action received in corresponding Japanese Application No. 2023-552658, dated Jul. 9, 2024, in 9 pages, with translation.
Japanese Patent Office, Office Action, Application No. 2025-020657, mailed Jan. 6, 2026, in 7 pages.

* cited by examiner

REFLECTOR SCANNER

CROSS-REFERENCE TO RELATED APPLICATIONS

This application is a US national stage application of International Application PCT/JP2021/037356, filed Oct. 8, 2021, the contents of which are incorporated by reference.

TECHNICAL FIELD

The present invention relates to a reflector scanner that scans a direction of a reflector.

BACKGROUND ART

There is known a driving device having a micro electro mechanical system (MEMS) structure in which a received light is reflected while being scanned in two axial directions perpendicular to one another as the reflector scanner.

Further, as the driving device, a device having a plate-like and rectangular first movable portion provided with three opening portions juxtaposed along a first direction, a second movable portion provided with a reflecting surface, and a supporting member has been proposed (see Patent Document 1).

The second movable portion is supported in a central opening portion of the first movable portion by a pair of first torsion bars stretching in a first direction. The supporting member supports the first movable portion by a pair of second torsion bars stretching in a second direction perpendicular to the first direction.

On a surface of the first movable portion, a first coil wired to surround the central opening portion and a second coil wired to surround the three opening portions along end portions of four sides of the first movable portion are disposed. In addition, the opening portions at both ends of the three opening portion of the first movable portion are each provided with a pair of magnetic member magnetized to polarities differing from one another by the first pair of magnets. The pair of magnets is disposed below the opening portion in the center of the first movable portion. Further, in a vicinity of a pair of sections along the second direction in the second coil at a periphery of the supporting member, a pair of second magnets facing one another with different polarities are disposed.

With the configuration, intermittently supplying a current through the first coil applies a force to a region (referred to as a first region) on the first movable portion, in which the first coil is disposed and the region is along the magnetic member. Accordingly, the second movable portion oscillates about the first torsion bar as a central axis. In addition, intermittently supplying a current through the second coil applies a force to a region (referred to as a second region) on the first movable portion, in which the second coil is disposed and the region is along the second magnets. Accordingly, the second movable portion oscillates about the second torsion bar as a central axis. As a result, the direction of the reflecting surface of the second movable portion is scanned in the first and second directions, and the received light is allowed to be scanned in the two axial directions.

Patent Document 1: Japanese Patent No. 6726356

DISCLOSURE OF THE INVENTION

Problems to be Solved by the Invention

Incidentally, in the drive device described in Patent Document 1, not only the second coil but also the first coil is wired in the region along the side where the second magnets of the end portions of the four sides of the first movable portion are adjacent. Therefore, in the driving device, in order to prevent the force applied to the region due to the current flowing through the first coil, so-called crosstalk, the second magnets are divided and placed in four locations within the region excluding the section where the first coil is wired.

Therefore, in constructing the driving device, four of the second magnets in addition to the first pair of magnets, that is, the magnets of six systems are necessary to prepare, an each need to be installed in a distributed manner. Thus, there has been a problem in that the number of parts increases and the structure becomes more complex, leading to higher manufacturing costs.

An object of the present the present invention is to provide a reflector scanner capable of suppressing manufacturing costs and crosstalk.

Solutions to the Problems

The reflector scanner according to the present invention includes a frame, a mirror portion, a first drive portion, and a second drive portion. The frame includes a frame-shaped portion extending along one surface and is held turnably about a first axis along the one surface. The mirror portion is connected to inside of the frame via a first elastic member stretching along a second axis along the one surface. The first drive portion that turns the frame in a direction of rotation about the second axis as a central axis. The second drive portion that turns the frame in a direction of rotation about the first axis as a central axis. The frame includes a set of bridge portions stretching to interpose the first axis inside the frame and spanning opposed portions of the frame across the second axis. The first drive portion includes: first paired magnets disposed to be opposed to one another such that the first paired magnets interpose the frame on the first axis; a first coil wired in a first annular portion formed by one bridge portion and a portion of the frame-shaped portion at one side of the first paired magnets with respect to the one bridge portion, the one bridge portion being closer to one magnet of the first paired magnets than the mirror portion; and a second coil wired in a second annular portion formed by the other bridge portion and a portion of the frame-shaped portion at the other side of the first paired magnets with respect to the other bridge portion, the other bridge portion being closer to the other magnet of the first paired magnets than the mirror portion. The second drive portion includes: second paired magnets disposed to be opposed to one another such that the second paired magnets interpose a region between the set of bridge portions of the frame on the second axis; and a third coil wired at least in the region between the set of bridge portions of the frame-shaped portion.

Furthermore, the reflector scanner according to the present invention includes a frame, a mirror portion, paired magnets, a coil, a first support pillar, and a second support pillar. The frame includes a frame-shaped portion extending along one surface and is held turnably about a first axis along the one surface. The mirror portion is connected to inside of the frame via a first elastic member stretching along a second axis along the one surface. The paired magnets are disposed to be opposed to one another so as to interpose the frame. The coil is wired in the frame-shaped portion and the set of bridge portions of the frame. The first support pillar is installed inside a casing of the first annular portion. The second support pillar is installed inside a casing of the second annular portion. The frame includes a set of bridge portions stretching to interpose the first axis inside the frame and spanning opposed portions of the frame across the second axis. The first support pillar is connected to one bridge portion of the set of bridge portions via an elastic member stretching along the first axis. The second support pillar is connected to the other bridge portion of the set of bridge portions via an elastic member stretching along the first axis.

Effects of the Invention

With the present invention, use of the four magnets allows the mirror portion to oscillate in the two axial directions while suppressing the influence (crosstalk), which is the influence of the driving current flowing through the coil for causing the frame connected to the mirror portion via the elastic member to turn in the direction of rotation about the second axis as the central axis on the force for causing the frame to turn in the direction of rotation about the first axis as the central axis.

Therefore, the present invention allows reducing a size of the device and its manufacturing cost.

DESCRIPTION OF PREFERRED EMBODIMENTS

The following describes embodiments of the present invention in detail with reference to the drawings.

Embodiment 1

Figures 1A, 1B:
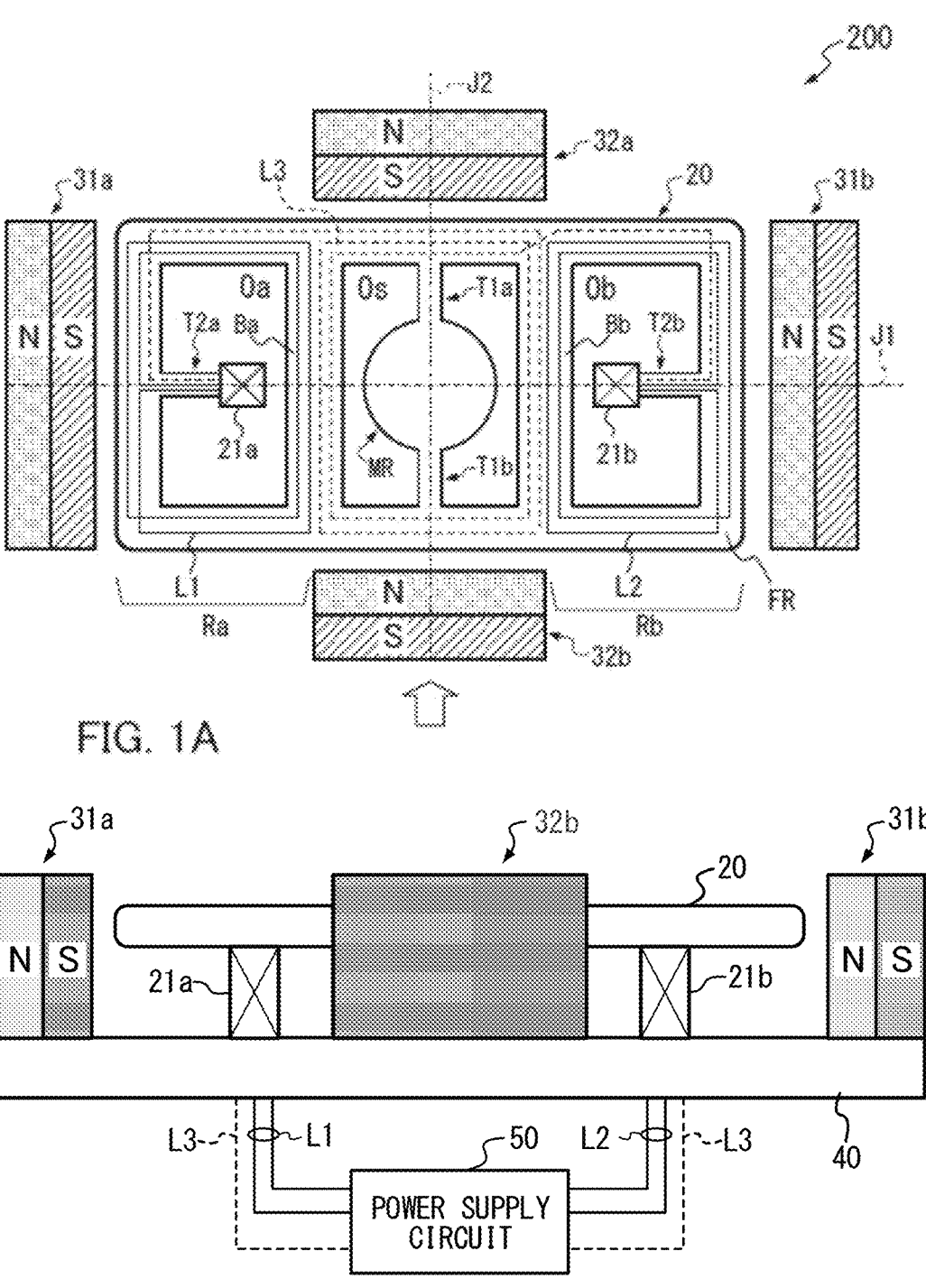
FIG. 1A is a top view of a reflector scanner 200 according to a first embodiment of the present invention.
FIG. 1B is a side view of the reflector scanner 200.

FIG. 1A is a top view of a reflector scanner 200 according to a first embodiment of the present invention, viewed from above, and FIG. 1B is a side view of the reflector scanner 200 viewed in a direction of a white arrow illustrated in FIG. 1A.

The reflector scanner 200 is, for example, a micro electro mechanical system (MEMS) mirror configured such that a mirror portion MR having a reflective surface oscillates in two axial directions in which a first axis J1 and a second axis J2 perpendicular to the first axis J1 are respective central axes of rotation.

As illustrated in FIG. 1A and FIG. 1B, the reflector scanner 200 includes a frame 20, support pillars 21a and 21b, a pair of magnets 31a and 31b as first magnets, a pair of magnets 32a and 32b as second magnets, and a base 40.

The frame 20 is sectioned into a frame-shaped portion FR and a set of bridges portions. The frame-shaped portion FR extends along an outer edge of one surface of the frame 20 with opening portions Oa, Os, and Ob juxtaposed along a direction of a first axis J1. The set of bridge portions include a bridge portion Ba between the opening portion Oa and the opening portion Os and a bridge portion Bb between the opening portion Ob and the opening portion Os. That is, the frame 20 includes the frame-shaped portion FR extending along the outer edge and the set of bridge portions Ba, Bb. The set of bridge portions Ba, Bb bridge between the frame-shaped portion FR, which stretch together to interpose the first axis J1, at opposed portions across the second axis J2.

In the frame 20, an annular region including the bridge portion Ba closer to the magnet 31a among the above-described set of bridge portions Ba, Bb and the frame-shaped portion FR around the opening portion Oa is referred to as an annular region Ra. Further, in the frame 20, an annular region including the bridge portion close to the magnetic 31b among the above-described set of bridge portions and the frame-shaped portion FR around the opening portion Ob is referred to as an annular region Rb.

In the opening portion Os, that is, in a region between the bridge portions Ba, Bb, the mirror portion MR is installed. The mirror portion MR is connected to the frame-shaped portion FR of the frame 20 via torsion bars T1a and T1b stretching along the second axis J2.

In the opening portion Oa, that is, inside the annular region Ra, a support pillar 21a is installed. The support pillar 21a is connected to the frame-shaped portion FR of the frame 20 via a torsion bar T2a stretching along the first axis J1.

In the opening portion Ob, that is, inside the annular region Rb, a support pillar 21b is installed. The support pillar 21b is connected to the frame-shaped portion FR of the frame 20 via a torsion bar T2b as an elastic member stretching along the first axis J1. The torsion bars T1a, T1b, T2a, and T2b are each made of an elastic member.

A coil L1, which is wired in a loop-shape or spiral-shape, is disposed at an annular portion of the annular region Ra. One end and the other end of a wiring constituting the coil L1 are connected to a power supply circuit 50 via a pair of wirings wired on a surface of the torsion bar T2a and inside of each of the support pillar 21a and the base 40.

A coil L2, which is wired in a loop-shape or spiral-shape, is disposed at an annular portion of the annular region Rb. One end and the other end of a wiring constituting the coil L2 are connected to the power supply circuit 50 via a pair of wirings wired on a surface of the torsion bar T2b and inside of each of the support pillar 21b and the base 40.

Furthermore, in a region between the set of bridge portions Ba, Bb (hereinafter also referred to as a central region), a coil L3 (indicated by a broken line), which is wired on the frame-shaped portion FR and the set of bridge portions Ba, Bb, is disposed to surround the mirror portion MR in a loop-shape or spiral-shape. One end of a wiring constituting the coil L3 is connected to the power supply circuit 50 via wiring installed on the frame-shaped portion FR, on a surface of the torsion bar T2a, and inside of the support pillar 21*a* and the base 40. Further, the other end of the wiring constituting the coil L3 is connected to the power supply circuit 50 via wiring installed on the frame-shaped portion FR, on a surface of torsion bar T2*b*, and inside of the support pillar 21*b* and the base 40. The support pillars 21*a* and 21*b* are installed on the base 40. While the wiring at the support pillars 21*a* and 21*b* may be routed inside thereof by using through-silicon vias (TSVs) as the support pillars, the wiring may be led out to outside across over the frame 20 and the magnets 31*a*, 31*b* by wire bonding with bonding pads provided on surfaces of the support pillars.

That is, as illustrated in FIG. 1A, in the frame 20, the coil L1 is installed in the annular region Ra, and the coil L2 is installed in the annular region Rb. In addition, in the central region between the annular region Ra and the annular region Rb, that is, the region between the set of bridge portions described above, the mirror portion MR and the third coil L3 are installed. The coil L3 includes a wiring section wired close to the magnet 32*a* or 32*b* so as to cross the region interposed by at least a pair of the magnets 32*a* and 32*b*.

The power supply circuit 50 supplies a first driving current, which is an alternating current for oscillating the mirror portion MR in a rotational direction about the second axis J2 as the central axis, to each of the coils L1 and L2. Further, the power supply circuit 50 supplies the coil L3 with a second driving current, which is an alternating current for oscillating the mirror portion MR in the rotational direction about the first axis J1 as the central axis. While in FIG. 1B the power supply circuit 50 is installed in a position spaced apart from the base 40, the power supply circuit 50 may be installed directly on the base 40.

The magnets 31*a*, 31*b*, 32*a*, and 32*b* are installed on the base 40 so as to be disposed one by one on positions of the outer circumference adjacent to respective sides of the frame 20. The height of each of the magnets 31*a*, 31*b*, 32*a*, and 32*b* from a surface of the base 40 is equal to or greater than the height from the base 40 to a front surface of the frame 20.

In addition, the magnets 31*a* and 31*b* as first paired magnets are installed on the base 40 so as to interpose the frame 20 with the surfaces having different polarities are opposed on the first axis J1.

In addition, the magnets 32*a* and 32*b* as second paired magnets are installed on the base 40 so as to interpose the frame 20 with the surfaces having different polarities are opposed on the second axis J2.

The length of each of the magnets 32*a* and 32*b* in a direction along the direction of the first axis J1 is set to a length that allows at least the central region, that is, the region between the set of bridge portions (Ba, Bb) to be interposed.

An operation of the reflector scanner 200 is described below with reference to FIG. 2.

Figure 2:
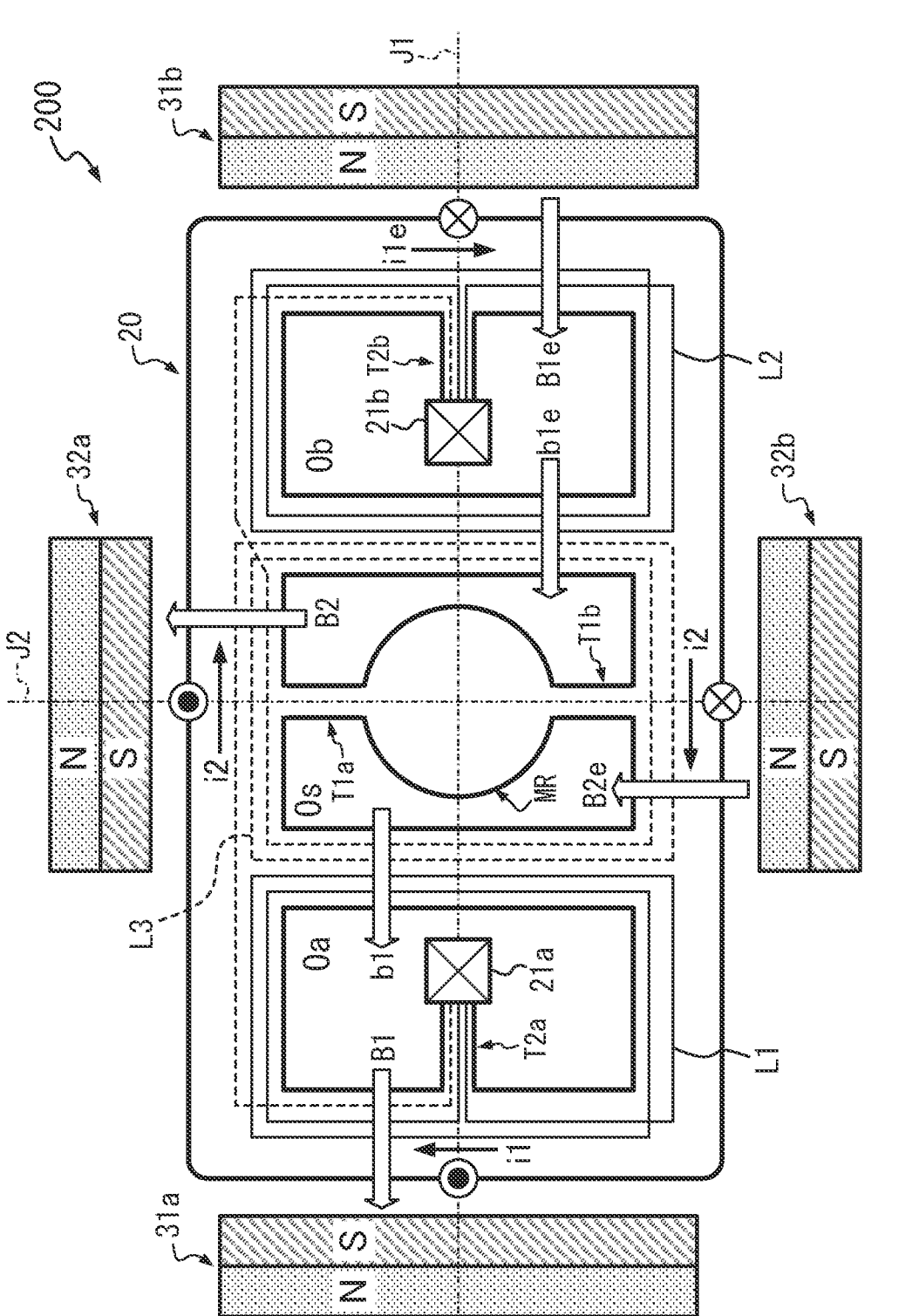
FIG. 2 is a top view of the reflector scanner 200 indicating directions of currents flowing through respective coils of the reflector scanner 200, directions of magnetic fields, and directions of Lorentz forces.

Note that FIG. 2 is a top view of the reflector scanner 200 illustrating directions of currents flowing through respective coils of the reflector scanner 200, directions of magnetic fields, and directions of Lorentz forces at one point in time, which are indicated by symbols or arrows.

The power supply circuit 50 supplies a drive current i1, which is an alternating current, to the coil L1 and also supplies the drive current i1*e*, which is an alternating current with the phase of the drive current i1 reversed, to the coil L2. As a result, at one point in time, the drive current i1 flows through the coil L1, for example, clockwise as illustrated by the arrow in FIG. 2, and the drive current i1*e* flows through the coil L2, for example, clockwise as illustrated by the arrow in FIG. 2.

Therefore, the first Lorentz force based on a magnetic field B1 (illustrated by the white arrow) by the magnet 31*a* and the drive current i1 (illustrated by the black arrow) across the magnetic field B1 is applied to a left end portion of the frame 20. Furthermore, the second Lorentz force based on the magnetic field B1*e* (illustrated by the white arrow) by the magnet 31*b* and the drive current i1*e* (illustrated by the black arrow) across the magnetic field B1*e* is applied to a right end portion of the frame 20. In this case, the direction of the first Lorentz force and the direction of the second Lorentz force are opposite to each other. That is, when one of the first and second Lorentz forces is applied in the direction that the front surface of the frame 20 faces, the other is applied in the direction that a back surface of the frame 20 faces. This applies a force (a couple of force) to the frame 20 that causes the frame 20 to rotate about the second axis J2 as the central axis. Furthermore, since the drive currents i1 and i1*e* are alternating currents, the directions of the Lorentz forces on the right end portion and the left end portion of the frame 20 are reversed at a period corresponding to a frequency of the alternating current, while maintaining the opposite directions each other.

As a result, the frame 20 reverses the direction of rotation about the second axis J2 as the central axis at the period corresponding to the frequency of the alternating current, and the torsion bars T1*a* and T1*b*, which receive the inertia force, twist for causing the mirror portion MR to oscillate in the direction of rotation about the second axis J2 as the central axis.

By the way, the direction of the drive current flowing at the bridge portion Ba (Bb) of the coil L1 (L2) is opposite to the drive current flowing through the frame-shaped portion FR on the left (right) end portion side of the frame 20. Therefore, the Lorentz force applied to the bridge portion Ba (Bb) due to the magnetic field B1 (B1*e*) illustrated in FIG. 2 is in the opposite direction to the Lorentz force applied to the left (right) end portion of the frame 20, that is, in the direction that prevents the frame 20 from rotating. However, a distance from the bridge portion Ba (Bb) to the magnet 31*a* (31*b*) is longer than a distance from the frame-shaped portion FR at the left (right) end portion of the frame 20 to the magnet 31*a* (31*b*). Therefore, since the magnetic field b1 (b1*e*) at the bridge portion Ba (Bb) generated by the magnet 31*a* (31*b*) is smaller than the magnetic field B1 (B1*e*), the generated torque is also smaller and has less effect on interfering with the rotating motion of the frame 20.

In the reflector scanner 200, the power supply circuit 50 supplies the drive current i2, which is an alternating current, to the coil L3. As a result, at one point in time, the drive current i2 flows through the coil L3 in the direction indicated by the arrow in FIG. 2 at the frame-shaped portion FR.

Therefore, in response to the magnetic field B2 (illustrated by the white arrow) by the magnet 32*a* and the drive current i2 (illustrated by the black arrow) across the magnetic field B1, the third Lorentz force is applied to the frame-shaped portion FR at an upper end portion of the frame 20. Furthermore, the fourth Lorentz force is applied to the frame-shaped portion FR at a lower end portion of the frame 20 in response to the magnetic field B2*e* (illustrated by the white arrow) by the magnet 32*b* and the drive current i2 (illustrated by the black arrow) across the magnetic field B2*e*. In this case, the direction of the third Lorenz force and the direction of the fourth Lorenz force are opposite to each other, that is, when one of the third and fourth Lorenz forces is applied in the direction facing the front surface of the frame 20, the other is applied in the direction facing the back surface of the frame 20. As a result, the frame 20 is subjected to the force (the couple of force) that causes the frame 20 to rotate about the first axis J1 as the central axis. Furthermore, since the drive current i2 is an alternating current, the direction of the Lorentz forces on each of the upper end portion and the lower end portion of the frame 20 are reversed at the period corresponding to the frequency of the alternating current, while maintaining opposite directions each other.

As a result, the frame 20 reverses the direction of rotation about the first axis J1 as the central axis at the period corresponding to the frequency of the alternating current, and the torsion bars T2a and T2b, which receive the inertia force, twist for causing the mirror portion MR to oscillate in the direction of rotation about the first axis J1 as the central axis.

By the way, with the magnetic field b1 (b1e) applied to the bridge portion Ba (Bb) and the drive current i2 flowing through the coil L3 across the magnetic field b1 (b1e), a couple of force that rotates the frame 20 about the second axis J2 as the central axis is also applied to the bridge portion Ba (Bb) as a cross-talk. However, as mentioned above, the distance from the bridge portion Ba (Bb) to the magnet 31a (31b) is longer than the distance from the left (right) end portion of the frame 20 to the magnet 31a (31b). Furthermore, since the distance from the bridge portion Ba (Bb) to the second axis J2 is short, the generated torque applied to the bridge portion Ba (Bb) is small, and the effect of the cross-talk is also small.

In the example illustrated in FIG. 1A, the frame 20 is provided with the one set of bridge portions (Ba, Bb). However, the number of bridge portions in the frame 20 is not limited to two. In other words, the number of bridge portions can be three or more as long as one set of bridge portions (Ba, Bb) surrounding the mirror portion MR is formed in the frame 20.

In short, the reflector scanner 200 oscillates the mirror portion in the two axial directions by employing a configuration including the following frame, mirror portion, and first and second drive portions.

That is, the frame (20) includes the frame-shaped portion (FR) extending along one face and held turnably about the first axis (J1) along the one face. The frame includes the set of bridge portions (Ba, Bb) stretching to interpose the first axis within itself and spanning opposed portions thereof across the second axis (J2) along the above-described one face. The mirror portion (MR) is connected to inside of the frame via a first elastic member (T1a, T1b) stretching along the second axis along the above-described one face. The first drive portions (31a, 31b, L1, L2) turn the frame in the direction of rotation about the second axis as the central axis, and the second drive portions (32a, 32b, L3) turn the frame in the direction of rotation about the first axis as the central axis. Here, the first drive portion includes the first paired magnets (31a, 31b) positioned opposite to each other on the first axis to interpose the frame, and the first and second coils wired in the frame. The first coil (L1) is wired in a first annular portion (Ra) formed by the one bridge portion (Ba) closer to the one magnet (31a) of the first paired magnets (31a, 31b) than the mirror portion and a portion on the one side of the first paired magnets than the one bridge portion of the frame-shaped portion (FR). The second coil (L2) is wired in a second annular portion (Rb) formed by the other bridge portion (Bb) closer to the other magnet (31b) of the first paired magnets (31a, 31b) than the mirror portion and a portion on the other side of the first paired magnets than the other bridge portion of the frame-shaped portion (FR).

With the configuration, the use of the four magnets allows the mirror portion to oscillate in the two axial directions while suppressing the crosstalk in which the drive currents (i1, i1e) flowing through the first and second coils to turn the frame in the direction of rotation about the second axis as the central axis affect the force to turn the frame in the direction of rotation about the first axis as the central axis.

Therefore, the present invention allows reducing a size of the device and its manufacturing cost compared with the driving device described in Patent Document 1, which requires six magnets.

Embodiment 2

Figure 3A:
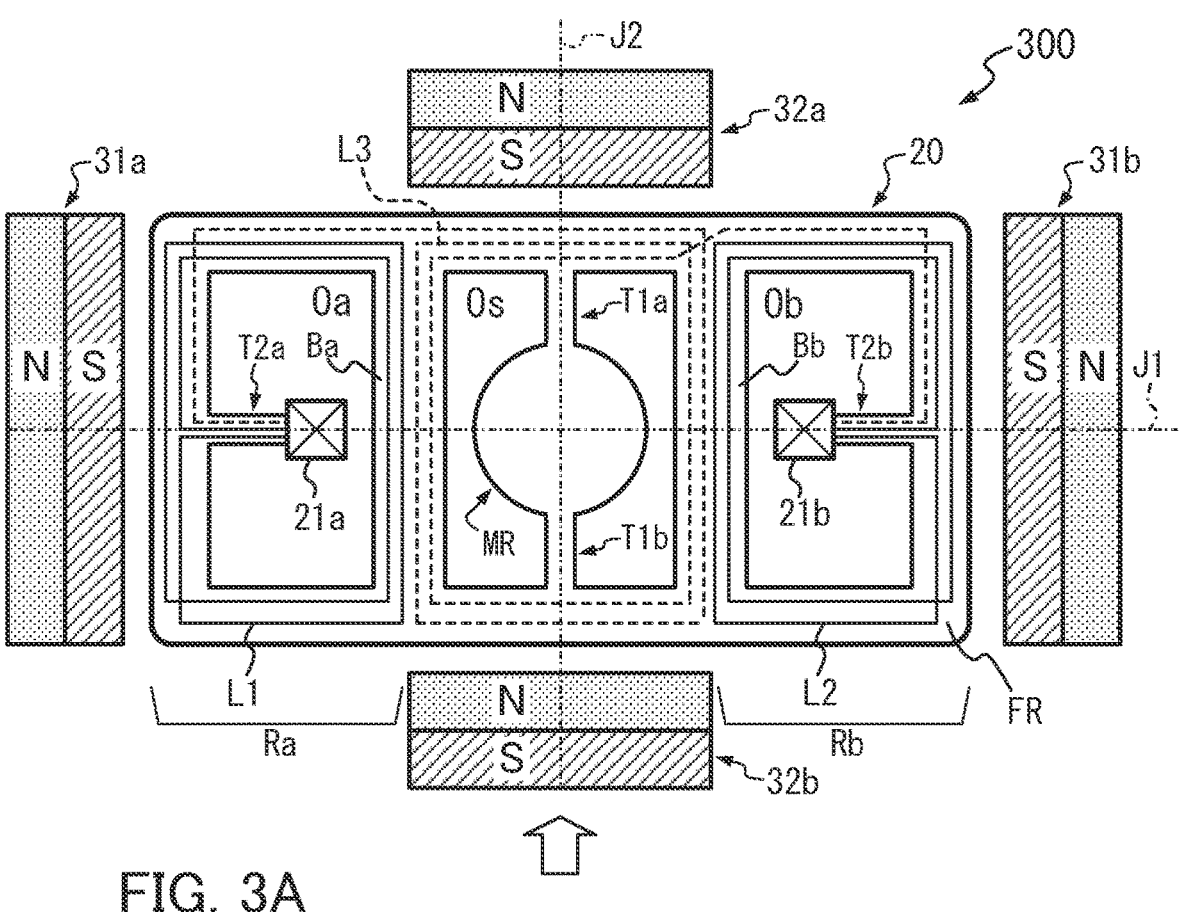
FIG. 3A is a top view of a reflector scanner 300 according to a second embodiment of the present invention.
Figure 3B:
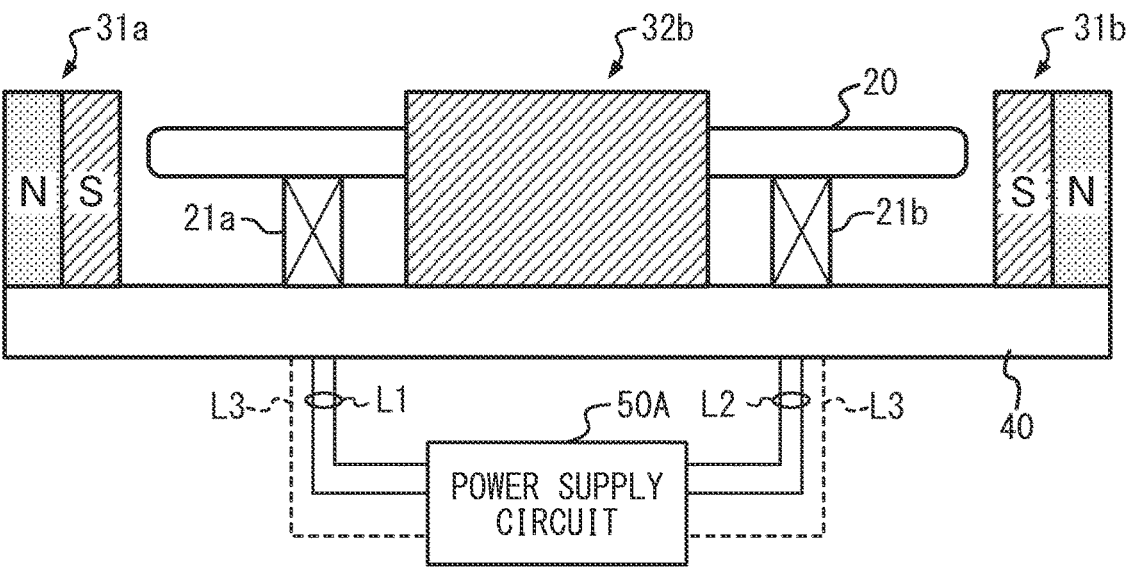
FIG. 3B is a side view of the reflector scanner 300.

FIG. 3A is a top view of a reflector scanner 300 according to a second embodiment of the present invention viewed from above, and FIG. 3B is a side view of the reflector scanner 300 viewed from a direction of the white arrow illustrated in FIG. 3A.

In the reflector scanner 300, the magnet 31b is installed on the base 40 such that a polarity (for example, S-pole) of an opposed surface, opposed to the magnet 31a, of the magnet 31b is opposite to the polarity of the magnet 31b (for example, N-pole) of the reflector scanner 200. In other words, in the reflector scanner 300, the magnets 31a and 31b as the first paired magnets are each installed on the base 40 such that the opposed surfaces of the magnets 31a and 31b have the mutually same polarity.

Furthermore, the reflector scanner 300 employs a power supply circuit 50A instead of the power supply circuit 50 included in the reflector scanner 200. The other configurations are the same as those of the reflector scanner 200 except for the above-mentioned points, so the explanation of the other configurations is omitted.

Figure 4:
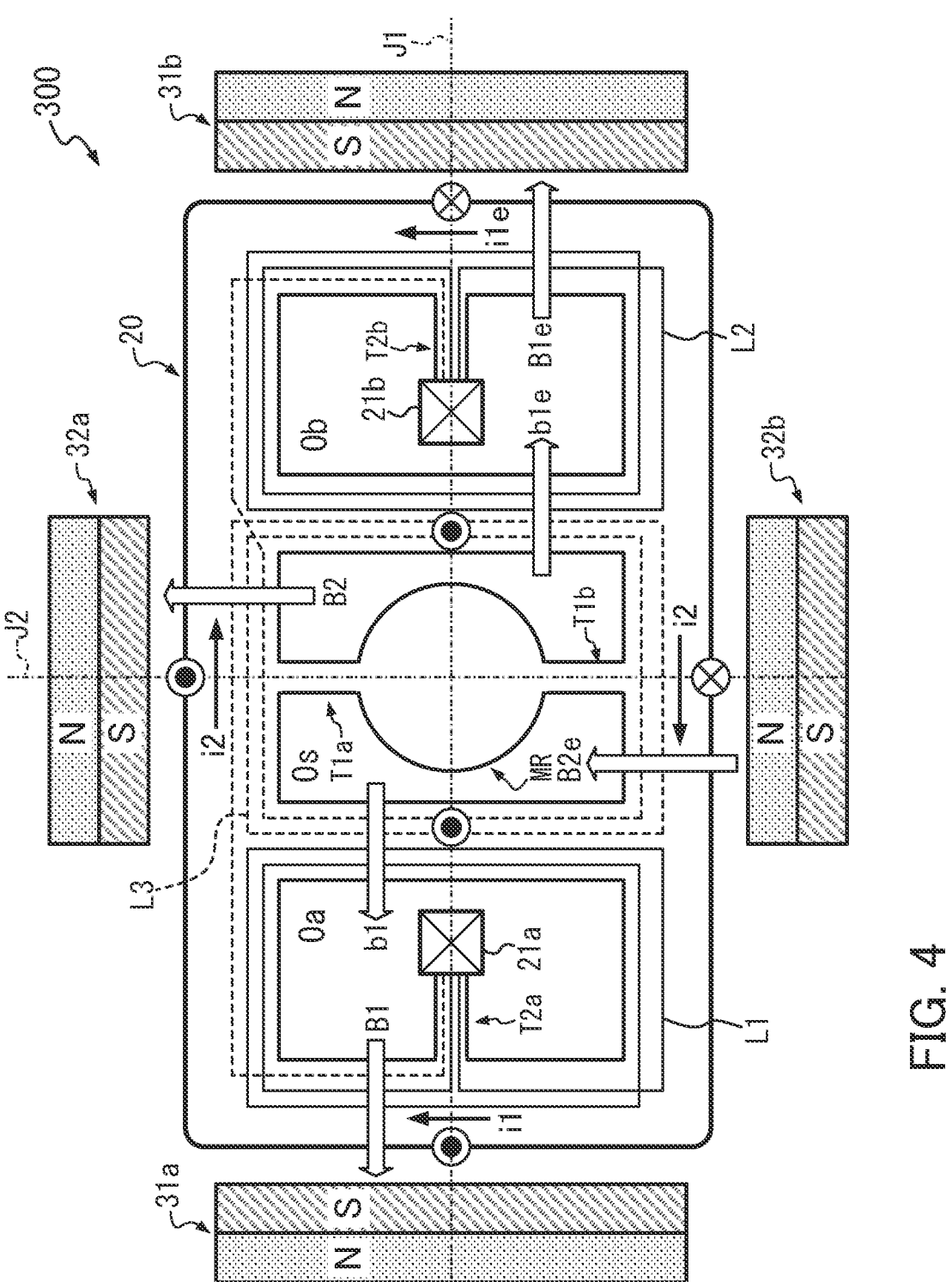
FIG. 4 is a top view of the reflector scanner 300 indicating directions of currents flowing through respective coils of the reflector scanner 300, directions of magnetic fields, and directions of the Lorentz force.

An operation of the reflector scanner 300 is described below with reference to FIG. 4. Note that FIG. 4 is a top view of the reflector scanner 300 illustrating directions of currents flowing through respective coils of the reflector scanner 300, directions of magnetic fields, and directions of Lorentz forces at one point in time, which are indicated by symbols or arrows.

The power supply circuit 50A supplies a drive current i2, which is an alternating current, to the coil L3. Furthermore, the power supply circuit 50A supplies the drive current i1, which is an alternating current, to the coil L1 and also supplies the drive current i1e, which is an alternating current of the same phase as the drive current i1, to the coil L2. As a result, at one point in time, the drive current i1 flows through the coil L1 in a clockwise direction as illustrated by the arrow in FIG. 4, and the drive current i1e flows through the coil L2, for example, in a counterclockwise direction as illustrated by the arrow in FIG. 4.

Therefore, the first Lorentz force is applied to the frame-shaped portion FR of a left end portion of the frame 20 in response to a magnetic field B1 (illustrated by the white arrow) by the magnet 31a and the drive current i1 (illustrated by the black arrow) across the magnetic field B1. Furthermore, the second Lorentz force is applied to the frame-shaped portion FR of a right end portion of the frame 20 in response to the magnetic field B1e (illustrated by the white arrow) by the magnet 31b and the drive current i1e (illustrated by the black arrow) across the magnetic field B1e. In this case, the direction of the first Lorentz force and the direction of the second Lorentz force are opposite to each other, that is, when one of the first and second Lorentz forces is applied in the direction that a front surface of the frame 20 faces, the other is applied in the direction that a back surface of the frame 20 faces. This applies a force (a couple of force) to the frame 20 that causes the frame 20 to rotate about the second axis J2 as the central axis. Furthermore, since the drive currents i1 and i1e are alternating currents, the directions of the Lorentz forces on the right end portion and the left end portion of the frame 20 are reversed at a period corresponding to a frequency of the alternating current, while maintaining opposite directions.

As a result, the frame 20 reverses the direction of rotation about the second axis J2 as the central axis at the period corresponding to the frequency of the alternating current, and the torsion bars T1a and T1b, which receive the inertia force, twist for causing the mirror portion MR to oscillate in the direction of rotation about the second axis J2 as the central axis.

In other words, in the reflector scanner 300, the mirror portion MR can be oscillated in the direction of rotation about the second axis J2 as the central axis similarly to the reflector scanner 200.

An oscillating motion of the mirror portion MR about the first axis J1 as the central axis by the drive current i2, the second paired magnets (32a, 32b), and the coil L3 is the same as an oscillating motion of the reflector scanner 200 described above, so the description thereof is omitted.

By the way, according to the configuration illustrated in FIG. 3A and FIG. 3B, the directions of the Lorentz forces on the respective bridge portions Ba and Bb are the same each other due to the drive current i2 flowing through the coil L3 and the magnetic field b1 (b1e) from the magnet 31a (31b). Therefore, the Lorentz forces on both regions mentioned above in response to the drive current i2 flowing through the coil L3 is not a couple of force for the rotational motion about the second axis J2 as the central axis.

Therefore, in the reflector scanner 300, there is no effect, or crosstalk, caused by the drive current i2 flowing through the coil L3 on the rotational motion of the frame 20 about the second axis J2 as the central axis.

Embodiment 3

Figure 5:
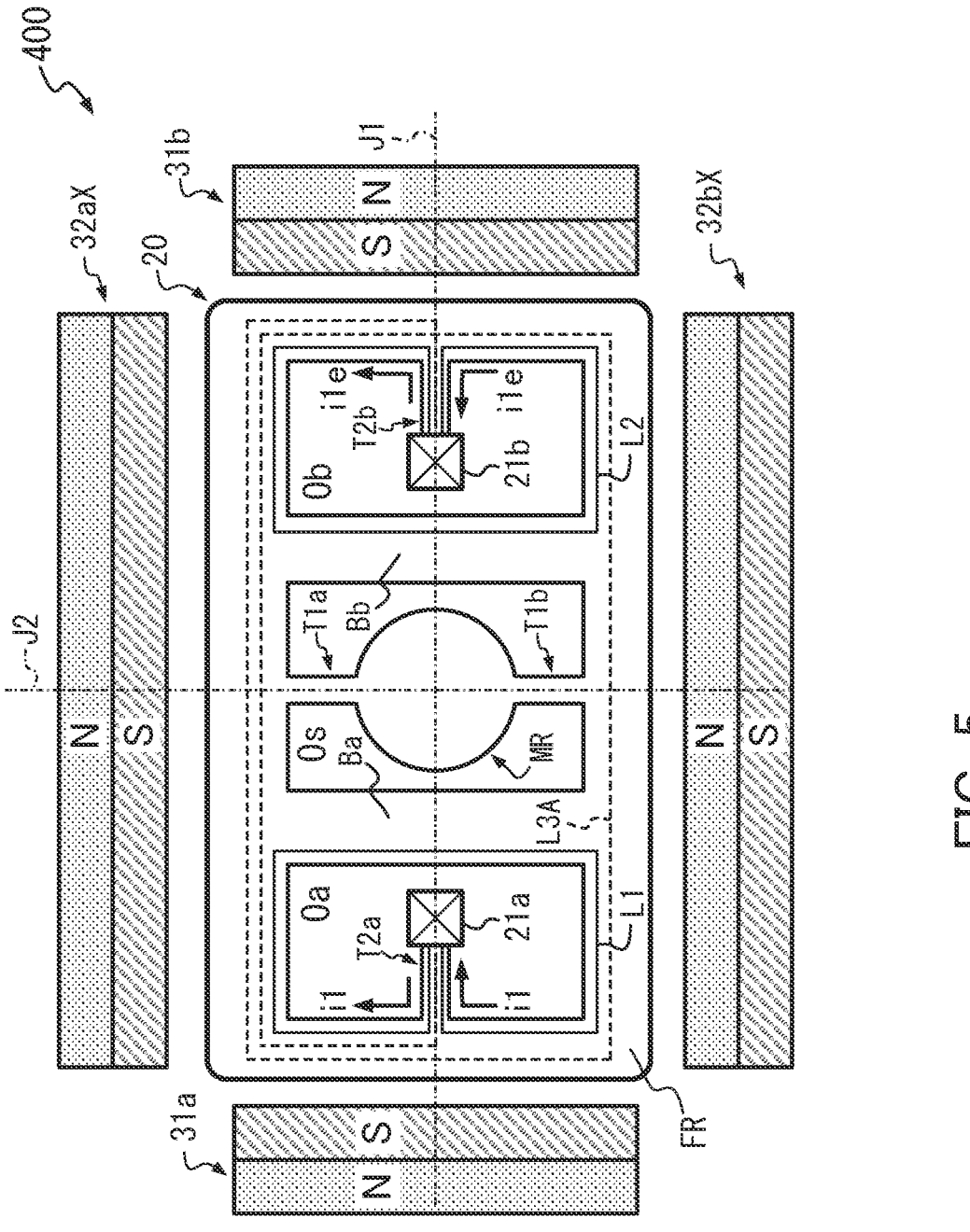
FIG. 5 is a top view of a reflector scanner 400 according to a third embodiment of the present invention.

FIG. 5 is a top view of a reflector scanner 400 according to a third embodiment of the present invention viewed from above.

The reflector scanner 400 has the same configuration as the reflector scanner 300, except for the point that magnets 32aX and 32bX are employed instead of the magnets 32a and 32b of the reflector scanner 300 illustrated in FIG. 3A, and a coil L3A is employed instead of the coil L3.

The following is a description of the operation performed by the reflector scanner 400 employing this configuration, focusing on the configuration of magnets 32aX and 32bX as the second paired magnets and the coil L3A.

As illustrated by the dashed line in FIG. 5, on a front surface of the frame 20, the coil L3A is wired in a loop-shape or spiral-shape at the frame-shaped portion of the frame 20 to surround a region where the mirror portion MR and the coils L1 and L2 are disposed. One end of a wiring constituting the coil L3A is connected to the power supply circuit 50A via a wiring installed on the surface of the torsion bar T2a, and inside of each of the support pillar 21a and the base 40. The other end of the wiring constituting the coil L3A is connected to the power supply circuit 50A via a wiring installed on the surface of the torsion bar T2b, and inside of each of the support pillar 21b and the base 40.

As illustrated in FIG. 5, the magnets 32aX and 32bX are each arranged outside of the frame 20 such that the magnets 32aX and 32bX interpose a wiring section where the coil L3A is wired along the first axis J1.

As illustrated in FIG. 5, in the reflector scanner 400, only the coils L1 and L2 are wired to the bridge portions Ba and Bb. However, the coil L3A is not wired to the bridge portions Ba and Bb.

As illustrated in FIG. 5, the magnets 32aX and 32bX as the second paired magnets have a longer length in the direction along the first axis J1 than the magnets 32a and 32b illustrated in FIG. 3A. As a result, the wiring section of the coil L3A across the magnetic field from the magnets 32aX and 32bX is longer than the wiring section of the reflector scanner 300 illustrated in FIG. 3A, and the Lorentz force is higher by that amount. Therefore, even when a current amount of the drive current i2 is reduced, the mirror portion MR can be surely oscillated in the direction of rotation about the first axis J1 as the central axis, thus enabling power saving and downsizing of the entire device.

Note that, due to the structure of the reflector scanner 400 illustrated in FIG. 5, there is no effect of the drive current i2 on the rotational motion of the frame 20 about the second axis J2 as the central axis, that is, no cross-talk. On the front surface of the frame 20, the direction of the Lorentz force generated in a region between the annular region Ra and the magnet 32aX (32bX) in response to the drive current i1 (i1e) is opposite to the direction of the Lorentz force generated in a region between the annular region Rb and the magnet 32aX (32bX). Therefore, the Lorentz force generated in the region between the annular region Ra and the magnet 32aX (32bX) and the Lorentz force generated in the region between the annular region Rb and the magnet 32aX (32bX) are cancelled out with respect to the rotational direction of the frame 20 about the first axis J1 as the central axis. Therefore, there is no influence, or crosstalk, on the rotational motion of the frame 20 about the first axis J1 as the central axis by the drive currents i1 and i1e, which are responsible for the rotational motion of the frame 20 about the second axis J2 as the central axis.

Embodiment 4

Figure 6A:
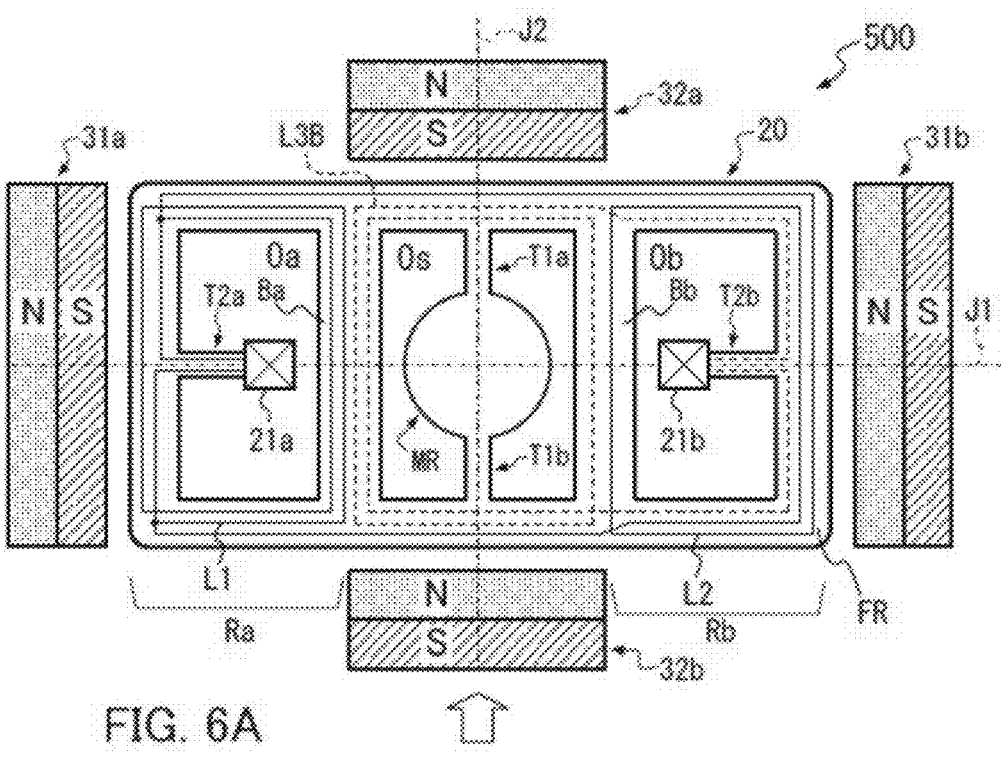
FIG. 6A is a top view of a reflector scanner 500 according to a fourth embodiment of the present invention.
Figure 6B:
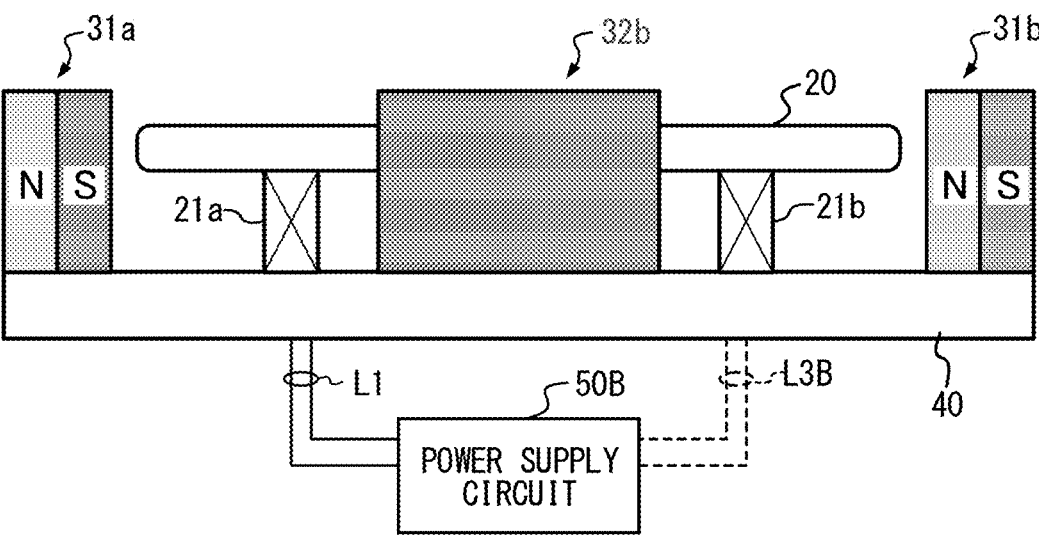
FIG. 6B is a side view of the reflector scanner 500.

FIG. 6A is a top view of a reflector scanner 500 according to a fourth embodiment of the present invention viewed from above, and FIG. 6B is a side view of the reflector scanner 500 viewed from the direction of the white arrow illustrated in FIG. 6A.

The reflector scanner 500 has the same configuration as the reflector scanner 200 illustrated in FIG. 1A and FIG. 1B, except for the point that the coil L1 and the coil L2 are connected in parallel with each other, the coil L3B is employed instead of the coil L3, and a power supply circuit 50B is employed instead of the power supply circuit 50.

The wiring configuration of the coils L1, L2, and L3B in the reflector scanner 500 will now be described.

As illustrated in FIG. 6A, in the reflector scanner 500, similarly to the reflector scanner 200 illustrated in FIG. 1A, the annular region Ra of the frame 20 includes the coil L1, the support pillar 21a, and the torsion bar T2a, while the annular region Rb includes the coil L2, the support pillar 21b, and the torsion bar T2b. Furthermore, in a central region between these annular regions Ra and Rb, the mirror portion MR, the torsion bars T1a, T1b, and the coil L3B are included.

Here, one end and the other end of the wiring constituting the coil L1 are connected to the power supply circuit 50B via a pair of wirings wired on the surface of torsion bar T2a, inside of each of the support pillar 21a and the base 40. One end and the other end of the wiring constituting the coil L2 are connected in parallel to the coil L1.

The coil L3B is wired in a loop-shape or spiral-shape to the pair of bridge portions Ba and Bb and the frame-shaped portion FR to surround the mirror portion MR similarly to the coil L3. However, one end and the other end of a wiring constituting the coil L3B are connected to the power supply circuit 50B via a pair of wirings installed on the frame-shaped portion FR around a periphery of an opening portion Ob, on the surface of torsion bar T2b, and inside of each of the support pillar 21b and the base 40.

The power supply circuit 50B supplies the drive current i1, which is an alternating current, to the coil L1 and the drive current i2, which is an alternating current, to the coil L3B.

According to the configuration of the reflector scanner 500 illustrated in FIG. 6A and FIG. 6B, the number of wirings wired on the surfaces of the torsion bars T2a and T2b can be reduced from three to two, which enables the width of these torsion bars T2a and T2b to be reduced. Furthermore, according to the configurations illustrated in FIG. 6A and FIG. 6B, the number of wirings of the coil L3B across the magnetic field by the magnet 32a in the section close to the magnet 32a and the number of wirings of the coil L3B across the magnetic field by the magnet 32b in the section close to the magnet 32b can be made the same. This makes it possible to balance the torques of the Lorentz forces that promote clockwise rotation and counterclockwise rotation about the first axis J1 as the central axis.

Embodiment 5

Figure 7:
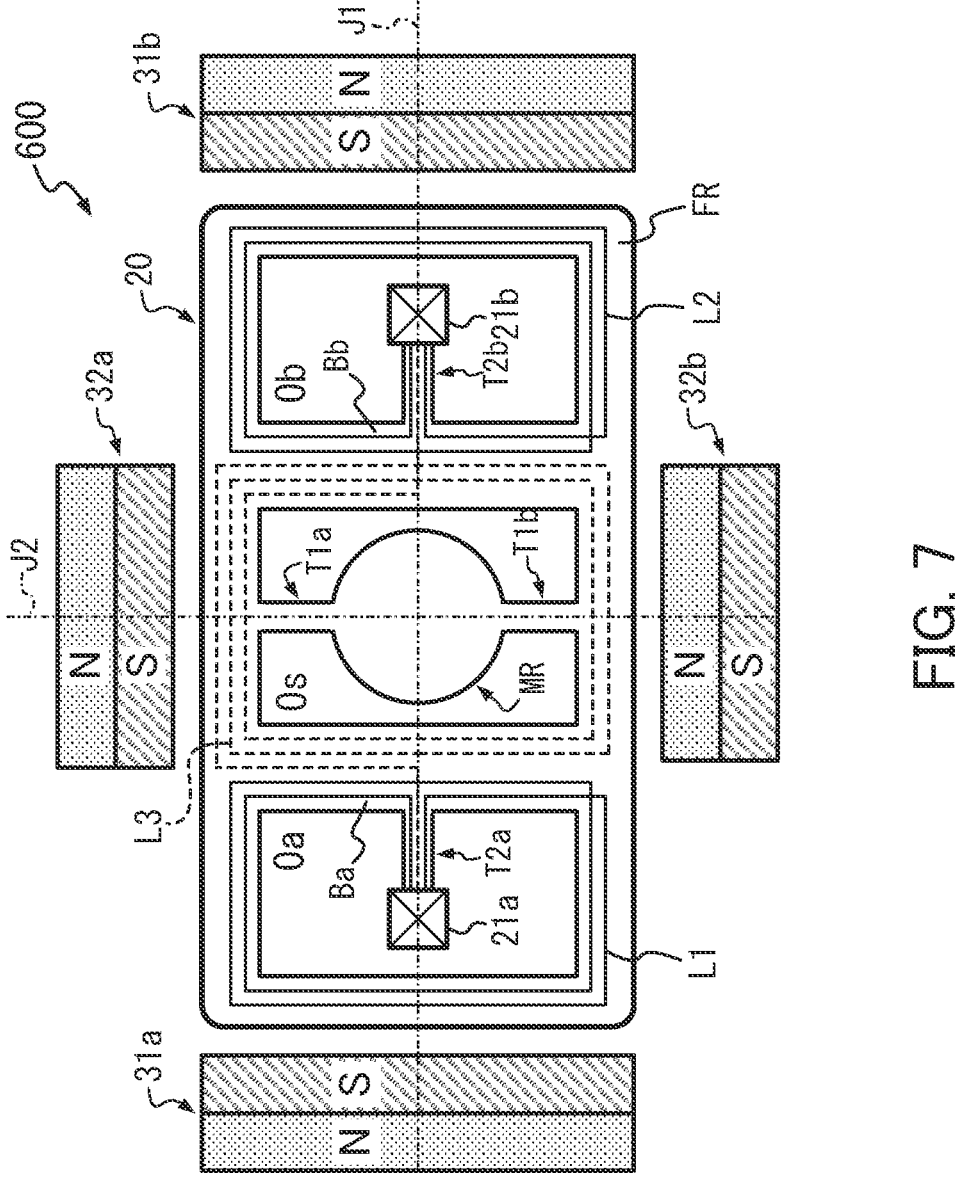
FIG. 7 is a top view of a reflector scanner 600 according to a fifth embodiment of the present invention.

FIG. 7 is a top view of a reflector scanner 600 according to a fifth embodiment of the present invention viewed from above.

As illustrated in FIG. 7, in the reflector scanner 600, the support pillar 21a is connected to the bridge portion Ba of the set of bridge portions (Ba, Bb) via the torsion bar T2a stretching along the first axis J1. The support pillar 21b is connected to the bridge portion Bb of the set of bridge portions (Ba, Bb) via the torsion bar T2b stretching along the first axis J1.

Other configurations except the above mentioned points are identical to the reflector scanner 300 illustrated in FIG. 3A and FIG. 3B.

According to the configuration illustrated in FIG. 7, a position of a connection point between a torsion bar T2a (T2b) and the frame 20 is closer to the second axis J2 than that of the torsion bar T2a (T2b) connected to the frame-shaped portion FR of the frame 20 as illustrated in FIG. 3A, for example. As a result, an amount of displacement associated with a deflection of the torsion bar T2a (T2b) during the rotation of the frame 20 about the second axis J2 as the central axis becomes smaller. Therefore, tensile stresses on the torsion bar T2a (T2b) and the wiring on the surface thereof are reduced, which extends the life of the torsion bar T2a (T2b) itself and reduces a probability of wiring breakage in the torsion bar T2a (T2b). This makes it possible to extend the life of the reflector scanner itself.

In the configuration illustrated in FIG. 7, the first drive currents (i1, i1e) flowing through the coils L1 and L2 cause the frame 20 to turn about the second axis J2 as the central axis, and the second drive current (i2) flowing through the coil L3 causes the frame 20 to turn about the first axis J1 as the central axis.

However, by placing only one single-wire coil of one system in a frame 20A in which the support pillar 21a (21b)

is connected to the bridge portions (Ba, Bb) via the torsion bar T2a (T2b) as illustrated in FIG. 7, and by supplying the coil in this one system with a current in which the first and second drive currents are superimposed as described above, the turn motion of the two axes may be realized.

Figure 8:
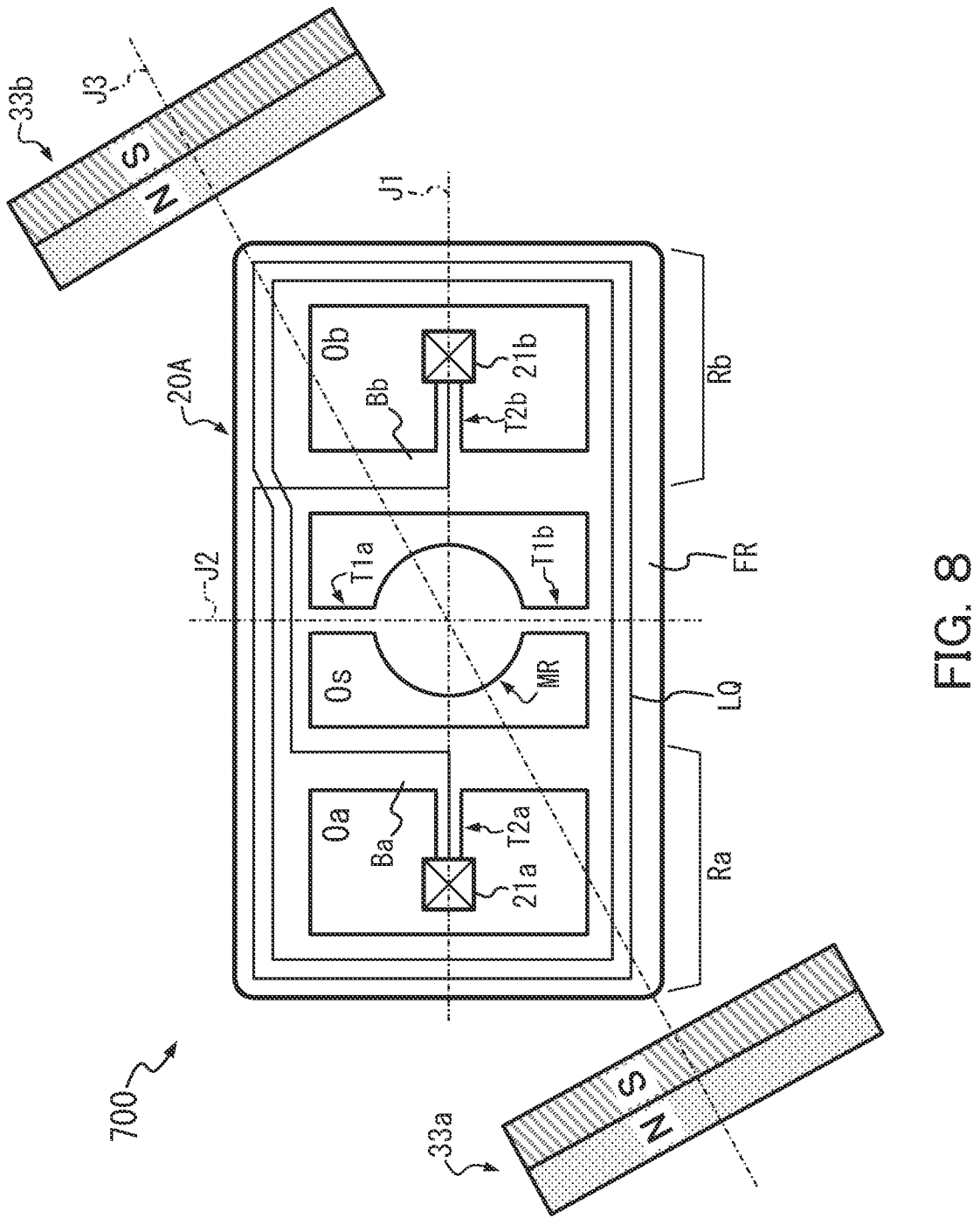
FIG. 8 is a top view of a reflector scanner 700 as a modification of the reflector scanner 600 according to the present invention.

FIG. 8 is a top view of a reflector scanner 700 as a modification of the reflector scanner 600 illustrated in FIG. 7 viewed from above.

As illustrated in FIG. 8, in the reflector scanner 700, a coil LQ including a single wire is wired in a spiral-shape or loop-shape to each of the annular regions Ra and Rb of the frame 20A and to the central region including the bridge portions Ba and Bb. In this case, one end of a wiring constituting the coil LQ is led outside via a single wire wired on the surface of the torsion bar T2a, and inside or on the surface of each of the support pillar 21a and the base 40. Furthermore, the other end of the wiring constituting the coil LQ is led outside via a single wire wired to the surface of the torsion bar T2b, and inside or on the surface of each of the support pillar 21b and the base 40.

Furthermore, in the reflector scanner 700, instead of using the four magnets (31a, 31b, 32a, 32b), paired magnets 33a and 33b are arranged opposite to each other with the frame 20A interposed on the third axis J3 stretching diagonally across the frame 20A.

Here, the power supply circuit generates a drive current in which the above-described drive currents i1, i1e, and i2 are superimposed, and supplies this current to one end and the other end of the wiring constituting the coil LQ, causing the frame 20A to turn in the rotational direction about the two axes (J1, J2) as the central axes.

DESCRIPTION OF REFERENCE SIGNS 20, 20A Frame
21a, 21b Support pillar
31a, 31b First paired magnets
32a, 32b, 32aX, 32bX, 33a, 33b Second paired magnets
40 Base
50, 50A, 50B Power supply circuit
FR Frame-shaped portion
L1, L2, L3, L3A, L3B, LQ Coil
MR Mirror portion
T1a, T1b, T2a, T2b Torsion bar

The invention claimed is:

1. A reflector scanner comprising:
a frame including a frame-shaped portion extending along one surface and held turnably about a first axis along the one surface;
a mirror portion connected to inside of the frame via a first elastic member stretching along a second axis along the one surface;
a first drive portion that turns the frame in a direction of rotation about the second axis as a central axis;
a second drive portion that turns the frame in a direction of rotation about the first axis as a central axis, wherein
the frame includes a set of bridge portions stretching to interpose the first axis inside the frame and spanning opposed portions of the frame across the second axis, and
the first drive portion includes:
first paired magnets disposed to be opposed to one another such that the first paired magnets interpose the frame on the first axis;
a first coil wired in a first annular portion formed by one bridge portion and a portion of the frame-shaped portion at one side of the first paired magnets with respect to the one bridge portion, the one bridge portion being closer to one magnet of the first paired magnets than the mirror portion; and a second coil wired in a second annular portion formed by the other bridge portion and a portion of the frame-shaped portion at the other side of the first paired magnets with respect to the other bridge portion, the other bridge portion being closer to the other magnet of the first paired magnets than the mirror portion;

the second drive portion includes:

second paired magnets disposed to be opposed to one another such that the second paired magnets interpose a region between the set of bridge portions of the frame on the second axis; and a third coil wired at least in the region between the set of bridge portions of the frame-shaped portion.

2. The reflector scanner according to claim 1, wherein the mirror portion is connected to the frame-shaped portion of the frame via the first elastic member in the region between the set of bridge portions of the frame, and the third coil is wired to surround the mirror portion via the set of bridge portions.

3. The reflector scanner according to claim 1, wherein the first paired magnets have respective opposed surfaces and are disposed to be opposed outside the frame such that the magnetic poles of the respective opposed surfaces are different, and the second paired magnets have respective opposed surfaces and are disposed to be opposed outside the frame such that the magnetic poles of the respective opposed surfaces are different.

4. The reflector scanner according to claim 1, wherein the first paired magnets have respective opposed surfaces and are disposed to be opposed outside the frame such that the magnetic poles of the respective opposed surfaces are identical, and the second paired magnets have respective opposed surfaces and are disposed to be opposed outside the frame such that the magnetic poles of the respective opposed surfaces are different.

5. The reflector scanner according to claim 4, wherein the third coil is wired in the frame-shaped portion of the frame to surround a region in which the mirror portion, the first coil, and the second coil are disposed, and the second paired magnets are each installed outside of the frame so as to interpose a wiring section wired along a direction of the first axis in a wiring of the third coil.

6. The reflector scanner according to claim 1, wherein the second coil has one end and the other end connected to the first coil.

7. The reflector scanner according to any one of claim 1, comprising:

a first support pillar installed inside of a casing of the first annular portion; and a second support pillar installed inside of a casing of the second annular portion, wherein the first support pillar is connected to the frame-shaped portion of the frame via an elastic member stretching along the first axis, and the second support pillar is connected to the frame-shaped portion of the frame via an elastic member stretching along the first axis.

8. A reflector scanner comprising:

a frame including a frame-shaped portion extending along one surface and held turnably about a first axis along the one surface;

a mirror portion connected to inside of the frame via a first elastic member stretching along a second axis along the one surface;

paired magnets disposed to be opposed to one another so as to interpose the frame;

a coil wired in the frame-shaped portion and the set of bridge portions of the frame;

a first support pillar installed inside a casing of the first annular portion; and a second support pillar installed inside a casing of the second annular portion, wherein the frame includes a set of bridge portions stretching to interpose the first axis inside the frame and spanning opposed portions of the frame across the second axis, and the first support pillar is connected to one bridge portion of the set of bridge portions via an elastic member stretching along the first axis, and the second support pillar is connected to the other bridge portion of the set of bridge portions via an elastic member stretching along the first axis.

* * * * *